Dec. 16, 1924.

N. C. JOHNSON

WEIGHT CONTROLLED DISPENSING APPARATUS

Filed Jan. 15, 1921   8 Sheets-Sheet 2

1,519,685

Dec. 16, 1924.
N. C. JOHNSON
1,519,685
WEIGHT CONTROLLED DISPENSING APPARATUS
Filed Jan. 15, 1921
8 Sheets-Sheet 5

INVENTOR
Nathan C. Johnson
BY
his ATTORNEY

Dec. 16, 1924.

N. C. JOHNSON

1,519,685

WEIGHT CONTROLLED DISPENSING APPARATUS

Filed Jan. 15, 1921  8 Sheets-Sheet 8

INVENTOR

BY

ATTORNEY

Patented Dec. 16, 1924.

1,519,685

UNITED STATES PATENT OFFICE.

NATHAN C. JOHNSON, OF ENGLEWOOD, NEW JERSEY.

WEIGHT-CONTROLLED DISPENSING APPARATUS.

Application filed January 15, 1921. Serial No. 437,449.

*To all whom it may concern:*

Be it known that I, NATHAN C. JOHNSON, a citizen of the United States, and a resident of Englewood, county of Bergen, and State of New Jersey, have invented certain new and useful Improvements in Weight-Controlled Dispensing Apparatus, of which the following is a specification.

My invention relates to weight-controlled dispensing apparatus, and more particularly to apparatus for dispensing a batch or charge of different materials to be mixed, the amount of each material making up the batch being determined and controlled by sequent but cumulative weighing thereof.

The invention in its present embodiment is especially useful for dispensing and determining the proper amounts of the different materials making up a batch of concrete.

The measuring or determining by volumetric measure, of powdered or granular materials such as sand, cement and the like, is very inaccurate. In the case of sand or cement, for example, it has been found that this inaccuracy may be in some cases as much as 60% of the absolute quantity of the material thus sought to be measured. This variation also fluctuates with the fineness of the material, its varying moisture content and the manner in which it is discharged into the measuring container, etc. In the case of coarser materials, the variation is not so great, but even with coarser materials the variation is sufficient to justify measurement by weight rather than by volume.

In making up successive batches or charges of different materials to be mixed to make up a composition either for the purpose of making up individual articles thereform or for the purpose of having the mixed batches enter into the building of a unitary structure, such for example as a concrete structure, it is of the utmost importance that the separate batches contain the same percentages of the different materials, so that in the case of individual articles made from the batches, they may be of uniform or standard characteristics, so that the manufacture of the same from such batches may be carried on by standard treatment without variation in the resulting article; and in the case of the building of unitary structures from such batches, so that the structure will be of uniform texture throughout. This is particularly true in the case of concrete structures because any variation in the quantities of the ingredients entering into the various batches not only causes a very wide variation in the consistency of the plastic material resulting from the mixture of each batch with a fixed quantity of water which in turn results in widely different properties in the character of the different portions of the structure made up from such batches, but also because the variation in the consistency of the batches may require different times for "setting" of the different batches. This, in conjunction with the different properties of the various adjacent portions of the structure being built from these batches, sets up different and undesirable stresses and strains in adjacent portions of the structure; and because of this lack of homogeneity and reliability, large factors of safety have to be indulged in to avoid accidents, with corresponding economic waste.

For the above reasons, the present general custom of determining by volumetric measure the relative amounts of the ingredients entering into batches of concrete, has been found to be highly undesirable. By determining the quantity of the different materials entering into the batches by weight these difficulties are overcome and the variation in the absolute quantities of the respective ingredients in successive batches is found to be very slight, not amounting to over 2% or 3%; but because of the inconvenience and time required in weighing the different ingredients by any means heretofore available the general custom of determining the ingredients by volumetric measure has continued.

The general object of the present invention is to overcome these difficulties by providing apparatus which will determine the amounts of the different ingredients by weight and automatically shut off the discharge of the different ingredients to the batch after the desired weight of each material has been delivered. To this end the objects of the invention are more particularly to provide reliable and efficient means for determining by weight, and for controlling the discharge of the different materials to the batch; to provide means of this character that will dispense the ingredients from individual chutes and automatically cut off the flow of the materials from one chute and open the next succeeding chute to be opened, and so on; and to control the discharge of material from said chutes by a single set of cumulatively acting weights.

The invention consists in the novel features, arrangements and construction of parts as hereinafter described according to the present preferred embodiment thereof, and the invention will be more particularly pointed out in the appended claims.

Further objects and advantages of the invention will more fully appear from the following description taken in connection with the accompanying drawings which illustrate by way of example the present preferred embodiment of the invention.

Figure 1:
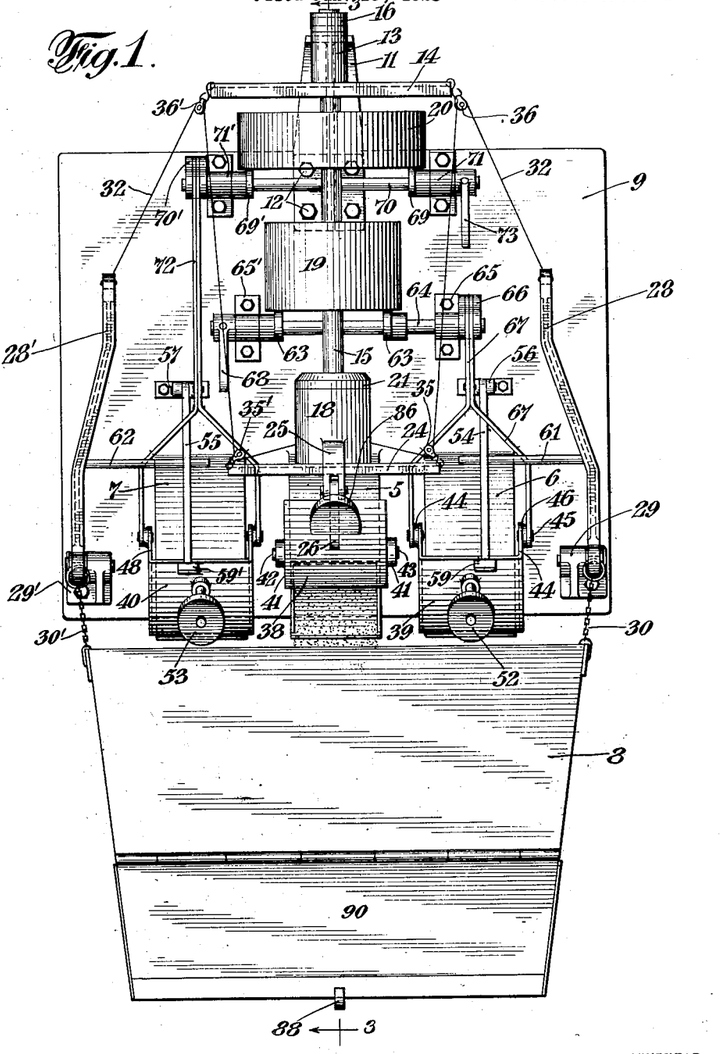
Fig. 1 is a front elevation of the preferred embodiment of the invention.
Figure 2:
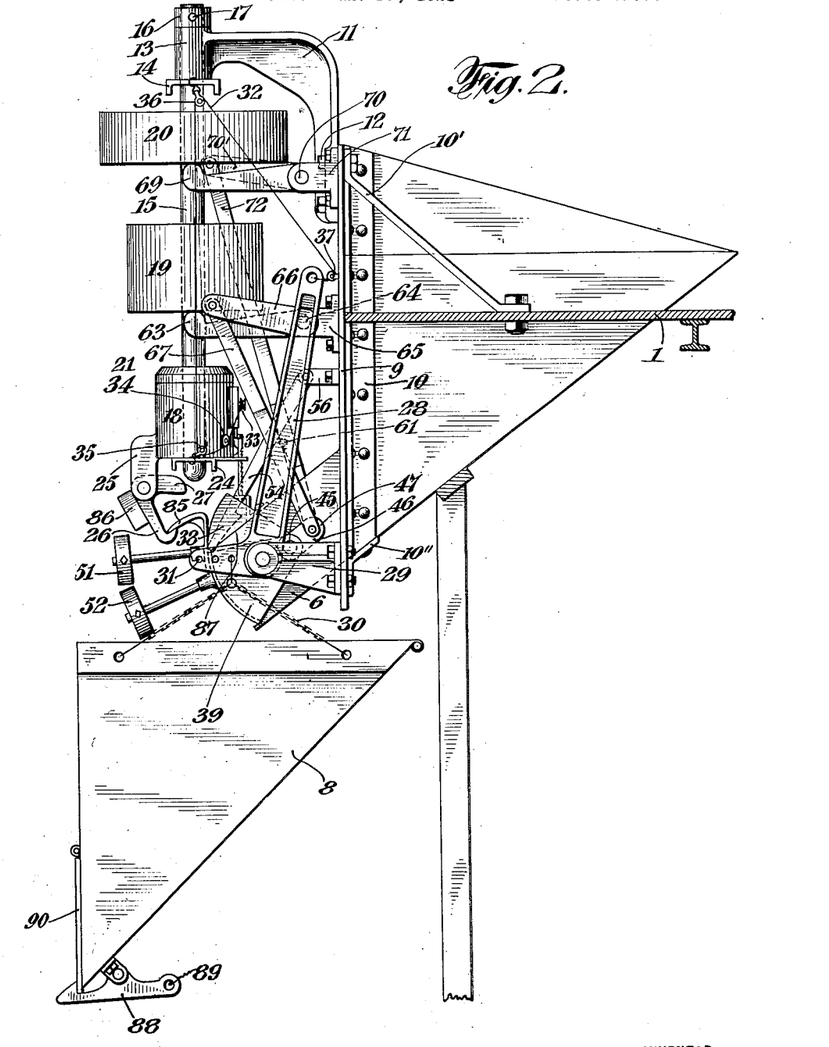
Fig. 2 is a side elevation looking from the right-hand side of Fig. 1, showing the parts in the position they assume when the first material is being discharged into the weighing container.
Figure 9:
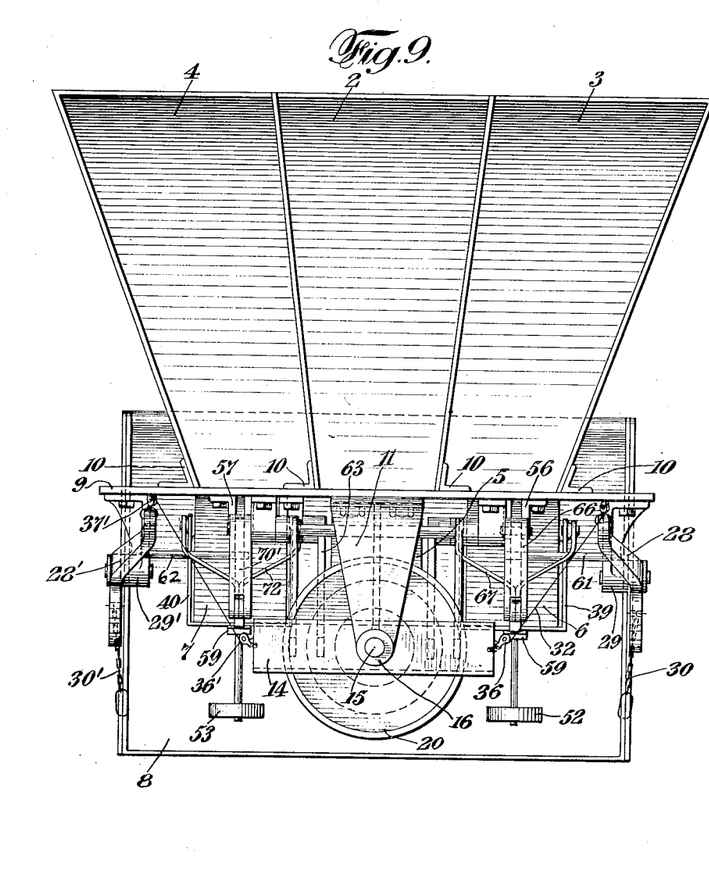
Fig. 9 is a top plan view of the apparatus.

Referring to the drawings, and more particularly to Figs. 1, 2 and 9. 1 is a suitable flooring or platform supporting a plurality of bins 2, 3, 4 for containing the different materials or sources of supply, from which extend individual spouts 5, 6, 7, adapted to discharge the ingredients from the respective bins for delivery into a common weighing container 8. 9 is a suitable supporting frame preferably arranged transversely of the spouts and detachably secured to the bins or hoppers by being bolted to suitable brackets 10, 10', etc. Upon this supporting frame is carried the weighing apparatus which in the present embodiment of the invention is arranged and mounted as follows:

A forwardly extending bracket 11 is secured by bolts 12 to the upper portion of the supporting frame, and at its outer end is provided with a hollow boss 13, and a transverse bar 14 secured to the bracket 11 in any suitable manner. From the boss 13 is suspended a guide rod 15 by means of sleeve 16 secured to the upper end of the rod by a pin 17.

Slidingly engaging this rod 15, as a guide, there are three counter or balancing weights 18, 19, 20. In the present form of the invention the different weights are shown in the form of what I might term "cheese box" weights. They are cylindrical in form, preferably made up of sheet metal and having inner hubs or sleeves with a sliding fit on the guide rod, and each is adapted to be loaded with any suitable divided material such as sand, the amount of which in each weight may be readily and conveniently varied at any time when the weights are being calibrated. The respective weights are provided with covers 21, 22, 23 to keep out foreign matter.

The first weight 18 with certain connected parts, is calibrated to counterbalance the weighing container, plus the desired weight of the first material to be charged. The first weight is carried by a lower cross bar 24 which forms a part of the weight, and the weight is provided with a bracket 25 to which is swiveled a weighted latch 26 having a heel 27. This latch is adapted to temporarily hold open the gate of the spout corresponding to this weight, as hereinafter described.

The second weight is calibrated so that it and the first weight together will counterbalance the container, plus the desired charge of the first and second ingredients, while the third weight is calibrated so that it together with the other two weights, will counterbalance the hopper or container with the desired charge of the three materials, and so on, in the case of apparatus for dispensing by weight more than three ingredients.

Figure 3:
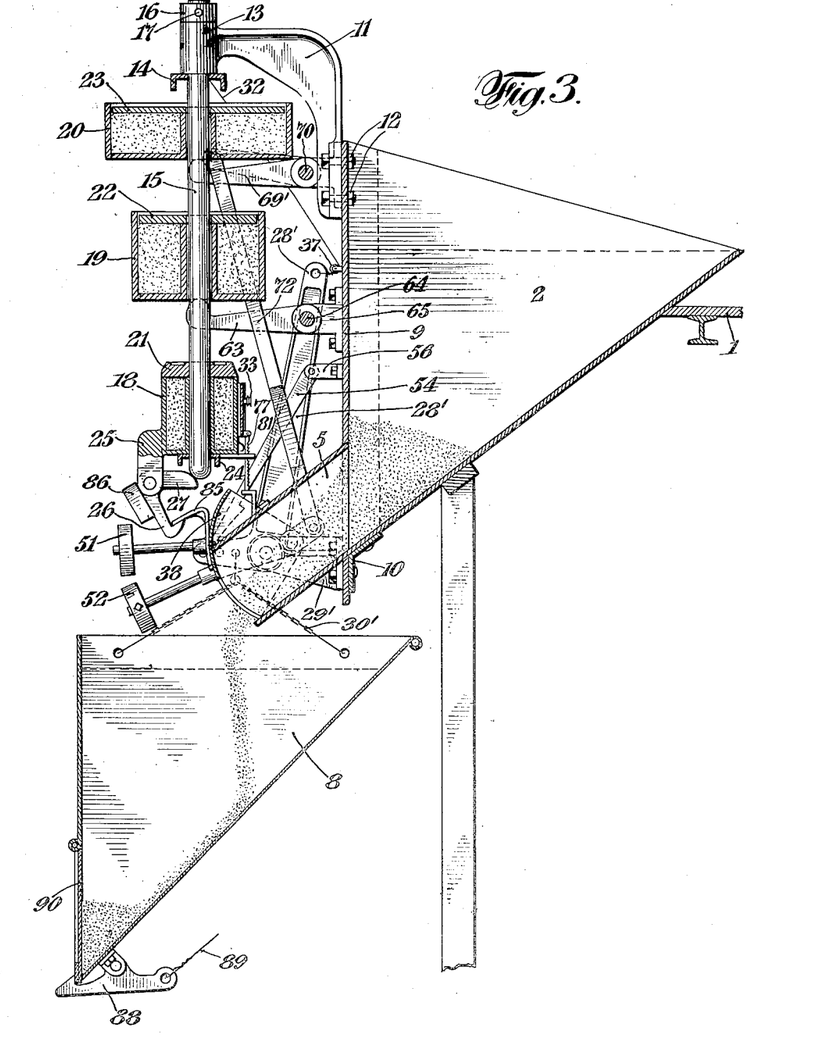
Fig. 3 is a sectional view taken on line 3—3 of Fig. 1, with the parts in the position shown in Figs. 1 and 2.

The second and third weights 19 and 20 are normally supported spaced apart as shown in Figs. 1 and 3, by apparatus hereinafter described; and are normally ineffective as counterweights, while the first weight 18 is at all times directly connected with the weighing container, and preferably through the following apparatus:

Main weighing levers in the form of bell crank levers 28, 28' are provided at each side of the supporting frame 9 and are pivoted upon brackets 29, 29' bolted to the said frame; and the weighing container 8 is suspended from the lower end of the bell crank levers by suitable connections 30, 30'. The lower arm of the lever is properly graduated, as for example by the drilling of holes 31, 31' at predetermined distances from its pivot for the attachment of the weighing container to the lever, so that the same weights and connecting mechanism may be utilized for weighing a greater or less total charge with proportionately greater or less amounts of the different ingredients merely by hooking the container into one or another of the holes along this arm of the lever.

The free ends of the bell crank levers are connected to the first weight by a looped cable 32 having its bite extending over a guide wheel or pulley 33 secured to the weight, the right-hand part of the cable thence extending over guide pulleys 34, 35, fixedly secured with respect to the weight 18, and thence over guide pulley 36 secured to the upper cross bar 14, thence over guide pulley 37 secured to the vertical supporting frame, and thence to the upper end of the bell crank lever 28; the opposite half of the cable being similarly guided by similar pulleys 34', 35', 36', 37' and connected to the upper end of the corresponding lever 28'.

By means of this connection, as the weight of the container with its contents overcomes the weight of the first counterweight 18, the upper ends of the bell crank levers 28, 28' commence to swing outwardly about their pivots, thus pulling on the ends of the cable 32 and lifting the weight 18 to shut off the discharge of materials from the spout controlled by said weight, as hereinafter explained. I have shown two bell crank levers and a looped cable connecting the same with the weight in order to make a properly balanced connection between the weight and the container so as to avoid distortion and side thrusts and stresses such as would set up friction and tend to reduce the accuracy of the weighing. But it will be understood that if desired, any other suitable connection between the weight and the container may be utilized.

Figure 4:
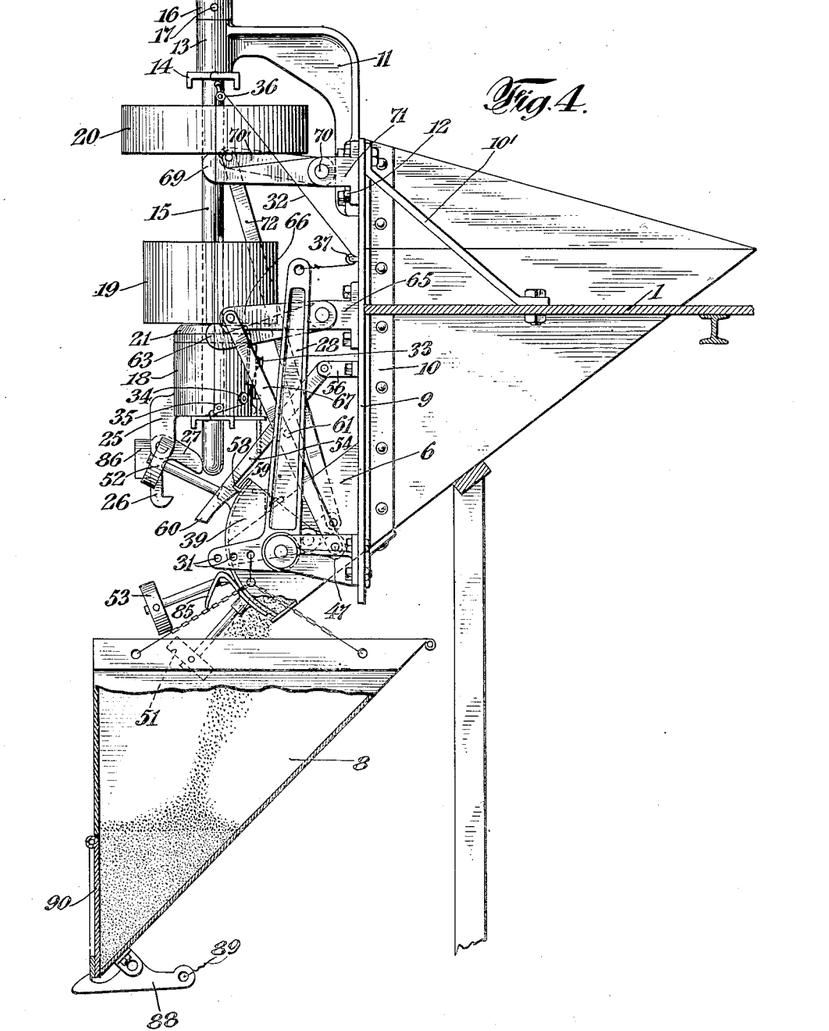
Fig. 4 is a side elevation similar to that shown in Fig. 2, with the parts in the positions they assume when the second material is being discharged into the weighing container, and with certain parts broken away.
Figures 7, 8:
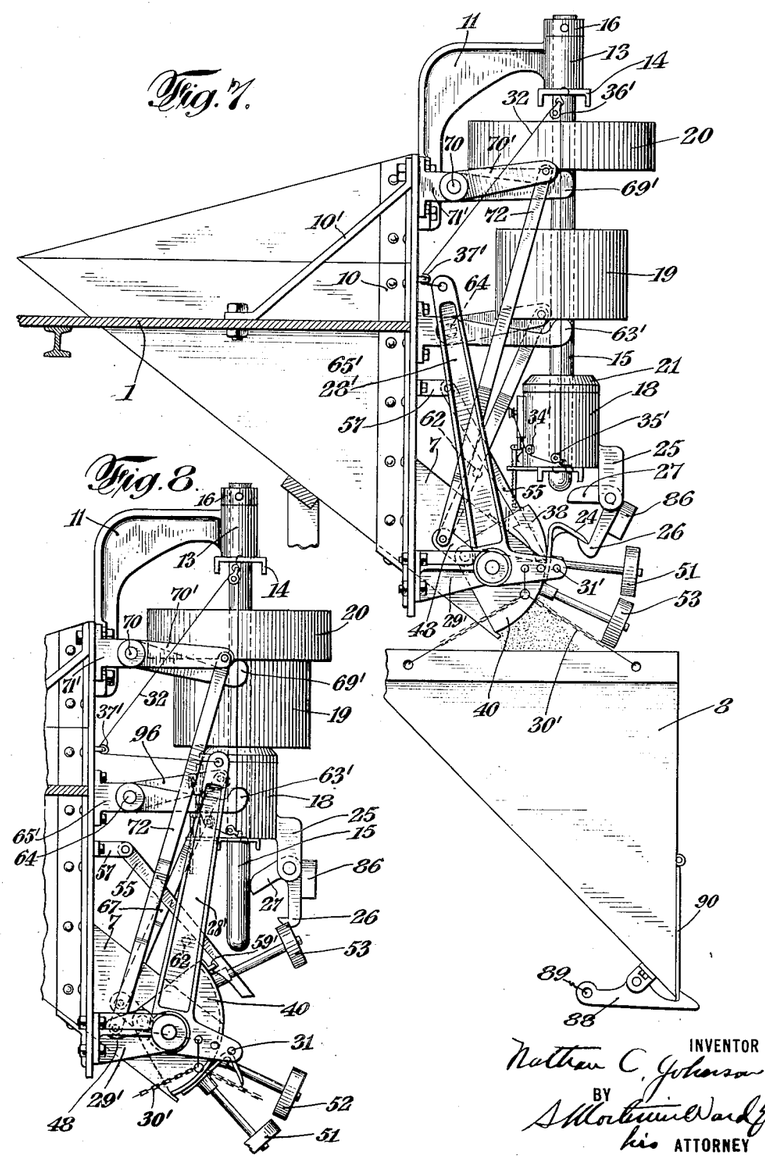
Fig. 7 is a view similar to Fig. 2 with the parts in the position shown in Fig. 2, but looking from the left of Fig. 1.
Fig. 8 is a view similar to Fig. 5, but looking from the left of Fig. 1.

The spouts 5, 6, 7 are provided with individual shut-off devices for controlling the discharge of ingredients therefrom, which in the present form of the invention are in the form of so-called "radial" gates 38, 39, 40, each pivoted to swing over the mouth of its chute to shut off the flow of material. The gate 38 has two rearwardly extending arms 41, 41, and is swiveled on pins 42, 43 secured to the sides of the corresponding chute 5; while the gate 39 is journaled on pins 45 extending from the sides of chute 6; and this gate has similar rearwardly extending arms 44, so that when these arms 44 are swung downwardly they will force the gate 39 upwardly to open the spout 6, as shown in Fig. 4. The gate 40 is similarly equipped with arms 48 extending rearwardly (see Fig. 7). The gates are further provided with adjustable weights 51, 52, 53 to make their closing more positive when they are released.

Above the gates 39, 40 are provided pivoted latch members 54, 55 which are carried by brackets 56, 57, secured to the supporting frame 9. Each latch member, aside from having a latch portion such as shown at 58 in Fig. 4 for engaging a projection 59 on its corresponding gate to hold the gate open when it is lifted, is also provided with a locking projection 60 adapted to normally rest upon the top of the gate when closed, to hold it in its closed position, this portion of the latch member thus serving as a locking dog to lock the gates closed until the latch member is lifted, thus preventing the gates from being opened except in a predetermined sequence, as hereinafter described.

The lifting of the latch 54 is accomplished responsive to the outward movement of the weighing lever 28 which moves when the first weight is overbalanced by the charge of the first material into the weighing container; or, in other words, the latch 54 is moved responsive to the overbalancing of the first weight; and this is accomplished, in the present embodiment of the invention, by means of an arm 61 extending inwardly from the lever 28 beneath the latch member 54 so as to engage the latch and lift it more and more as the lever 28 is swung forward responsive to increased weight of materials in the weighing container. The engagement of the latch by this arm not only effects the unlocking of the second gate by lifting the latch from locking engagement with the gate when the first weight has become overbalanced, but the further swinging of the arm 61 against the latch and the further lifting of the latch to a position of release in response to the overbalancing of the second weight by materials discharged from the second spout, also effects the closing of the corresponding or second gate 39 to shut off the discharge of material.

The swiveled latch 55 is similarly arranged and constructed to similarly co-operate with the gate 40, and is similarly swung on its pivot by means of an arm 62 extending inwardly from the main weighing lever 28', the adjustment of the arm 62 with respect to the latch 55 being such that this latch will not be lifted to unlock the gate to permit its being opened until the second weight has been overbalanced and the apparatus ready to receive the discharge of the material from the third gate 40, and also such that the latch will not be tripped to permit closing the gate in the manner before described until the weighing levers have been swung further forward responsive to the overbalancing of the third weight by a delivery of the proper quantity of the third material to the hopper.

I will now describe the means for normally supporting the second and third weights while they are ineffective as balancing weights, and the means normally operatively connecting these weights respectively with the gates of their corresponding hoppers whereby these weights effect the opening of their respective gates when the corresponding latches are moved to unlock them.

Referring to the second weight, it normally rests on arms 63 which are spaced apart sufficient to permit the first weight 18 to move up between them, and these arms in turn are rigidly keyed to a shaft 64 pivoted in brackets 65, 65' supported by the frame 9. The right-hand end of the shaft 64 has rigidly secured to it a crank arm 66 the outer end of which is connected to a forked link 67 the lower ends of which are swiveled to the arms 44 extending rearwardly from the gate 39. The weight 19 when in its normal position on its arms 63 tends to rotate the arms down about the axis of shaft 64, thus tending to swing the crank arm 66 down and through the connecting forked link 67, to swing the gate open about its swivel axis. But since the locking dog or latch 54 has its nose normally resting on top of the gate so as to take up the thrust from the gate in its tendency to open, the gate is thus held locked in position and the weight-supporting arms 63 prevented from swinging downward until the latch member 54 is tripped to permit the gate to swing upward, whereupon the weight will swing the arms 63 downward, opening the gate.

In order to limit the downward movement of the second weight 19, I provide a stop arm 68 adjustably secured to the left-hand end of shaft 64 to limit the rotation of the shaft downwardly, thus allowing only sufficient rotation of the shaft to insure the opening of the gate. In the meantime the weight 18 which was overbalanced by the charge of the first ingredient and therefore commenced to move upward, will almost immediately reach the second weight so as to engage and support it when the arms 63 are rocked downward. The stop 68 thus prevents the momentary sudden dropping of the second weight a sufficient distance for it to acquire such momentum, before it is met by the first weight, as to cause it to set up any violent vibrations or strains on the parts, and it thus insures smoother operation of the parts. If the releasing of the second weight 19 onto the first weight momentarily overbalances the weighing container before the charge of the second material is sufficient to balance the two weights, thus causing a momentary backward rocking of the weighing levers 28, this will not affect the sequence of the operation since the forward movement of the lever 28 will have already, through the arm 61, lifted the latch 54 sufficiently to cause the upwardly swinging gate to be latched in open position where it will remain until the latch is again struck by a further forward movement of the arm 61 to unlock the gate.

The connections between the third weight 20 and its corresponding gate 40 are substantially identical to those described with respect to the second weight and its corresponding gate, except that the connecting link is on the opposite side of the apparatus. The two supporting arms 69, 69' for the third weight are secured to a shaft 70 journaled in brackets 71, 71' secured to the main frame, and the left-hand end of the shaft 70 is provided with a crank arm 70' pivoted to a forked link 72 having its lower ends secured to the arms 48 (see Figs. 7 and 8) extending from the rear of the gate 40; and the adjustable limiting stop 73 is secured to the right-hand side of the shaft 70 to limit the downward movement of the weight 20 when the latch 55 to gate 40 is lifted to permit the downward movement of said third weight 20.

Figure 10:
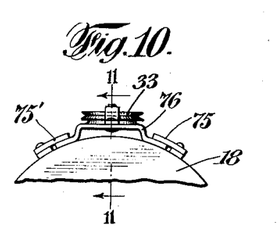
Figure 11:
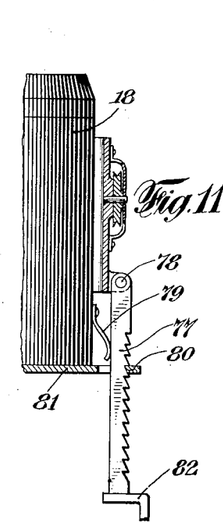

Instead of having the looped cable 32 simply running through a guide pulley secured directly to the first weight 18, I have provided an automatically actuated ratchet take-up device on this weight on which the guide pulley 33 for the looped cable is mounted. This apparatus is more clearly shown in Figs. 10 and 11, where the rear of the weight 18 is shown as provided with vertical strips 75, 75' forming, with the wall of the weight, a slideway for a sliding member 76 to which is secured the pulley 33 over the top of which the cable or rope passes as shown in Fig. 2, thus by its tension tending at all times to move the slide 76 downward, but the downward movement of the slide is prevented by the teeth of a ratchet bar 77 which is swiveled on the slide 76 at 78, and is held pressed forward by a spring 79, with the ratchet teeth in engagement with a stationary pawl member 80 formed in an extension 81 secured to the bottom of the weight. A striking plate 82 is provided in alignment with the path of movement of the ratchet member 77, and is so adjusted that with the predetermined normal length of cable 32, and the weight 18 in its lowermost position, the lower end of the ratchet member just barely touches, or does not quite touch, the striking plate, so that in the event that the cable 32 is stretched, the weight 18, because of this extra length of cable, will tend to fall lower than its normal zero position, and thus cause the ratchet member to engage the striking plate and be lifted one or more notches according to the amount of stretch in the cable. Thus after each weighing operation, if there is any stretch in the cable, it is automatically taken up to insure the proper effective length of cable and thus the proper position of the rocking levers 28 for controlling the parts of the mechanism.

Having thus described the arrangement, construction and functions of the parts, I will now describe the complete operation of the parts in automatically dispensing the materials and cutting off the discharge of materials to the weighing container when the proper and predetermined quantity of each material is delivered to the weighing hopper.

With the stock bins charged with the ingredients that are to enter into a batch— such for example as a batch of concrete, in which case the hopper 2 will be filled with cement, the hopper 3 with sand, and the hipper 4 with stones to commence the operation, the first or central gate 38 is lifted, and as it is lifted, a bar 85 at the front of the gate strikes the nose of latch 26 carried by the first weight, to momentarily swing it forward, whereupon, due to its weight 86, the latch immediately rocks back to engage the bar 85 to latch the gate open, whereupon the cement commences to discharge into the weighing container.

It will be observed that in this position of the parts the downward thrust produced on the latch by the tendency of the gate to close by gravity, must be reckoned with and computed as a part of the force acting to counterbalance the container, so that in calibrating the first weight this must be taken into consideration. When sufficient material has been discharged from this chute to counterbalance the first weight, the weighing container will cause the weighing levers 28, 28' to commence to swing forward on their pivots, and the first weight will thus commence to move upward. But as soon as the lever 28 commences to move forward the horizontal arm 61 carried thereby engages the latch member 54 for the second gate, lifting the latch sufficiently to permit the gate to be swung upwardly, whereupon the weight of the second weight 19 acting through the levers above described, throws the said second gate open, and its upper projection 59 engaging the lower surface 87 of the end portion 60 of the latch member 54 causes the latch member to be further lifted away from the cross arm 61 until the shoulder of the latch drops over the said projection, thus locking the gate open; but as the first weight commences to rise, the heel 27 of the latch 26 controlling the first gate engages the lower end of the guide rod 15, so that as the first weight moves upward, latch 27 is swung about its pivot to release the gate 38 and thus shut off the discharge of cement to the container. While these consecutive operations follow in rapid order, and the intervals are only momentary, it will thus be seen that the gate to the second or sand chute, which in this case is the right-hand gate, is thus opened to commence the discharge of the second material before the discharge of the first material is shut off, thus insuring against the apparatus stopping in its automatic operation due to the first weight exactly counterbalancing the first charge of material. And a further assurance of positive rising of the first weight is given by its weight being decreased as soon as the first gate has been relieved from its attachment to this weight through tripping of the latch 26.

The first weight, due to its being overbalanced by the discharge of the first material or cement into the container, as well as by the commencement of the discharge of the sand, thus moves up into engagement with the second weight which has, as heretofore explained, been partly let down from its normal position by the downward rocking of its supporting arms, whereupon the combined weight of the first and second weight is effective in counterbalancing the container as it is being charged from the second chute, the parts at this stage of the proceeding being as shown in Fig. 4.

Figures 5, 12:
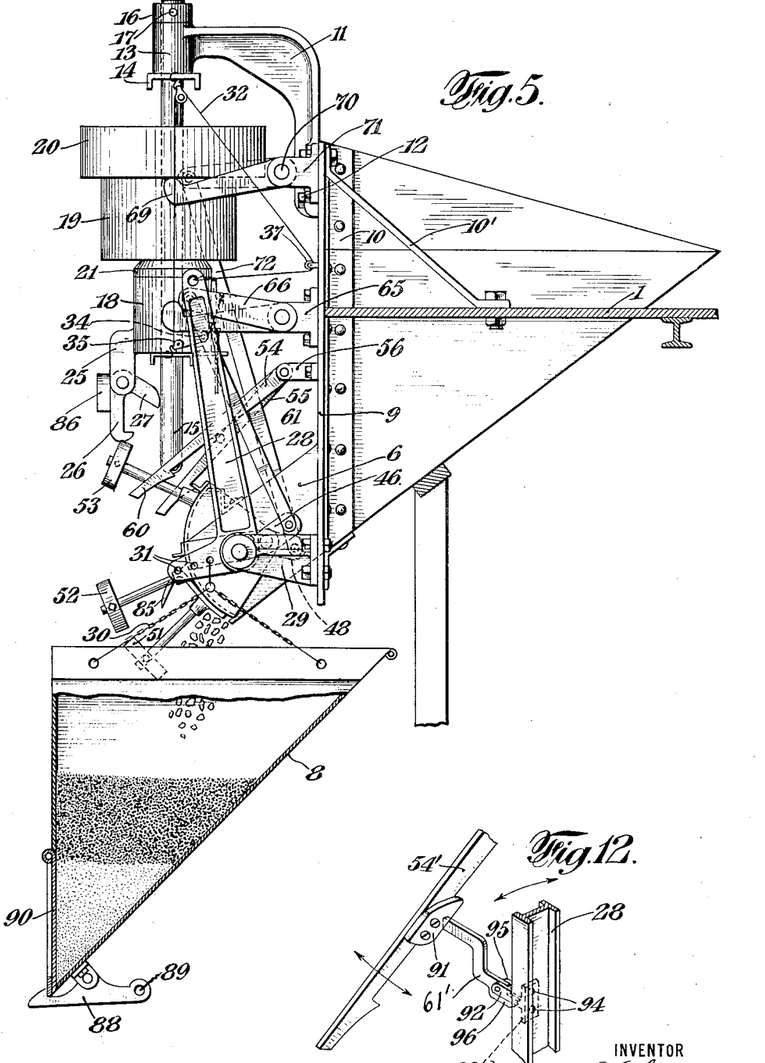
Fig. 5 is a view similar to Fig. 4, with the parts in the position they assume after the second material has been discharged into the weighing container.
Figs. 10 to 12, inclusive, show details.
Figure 6:
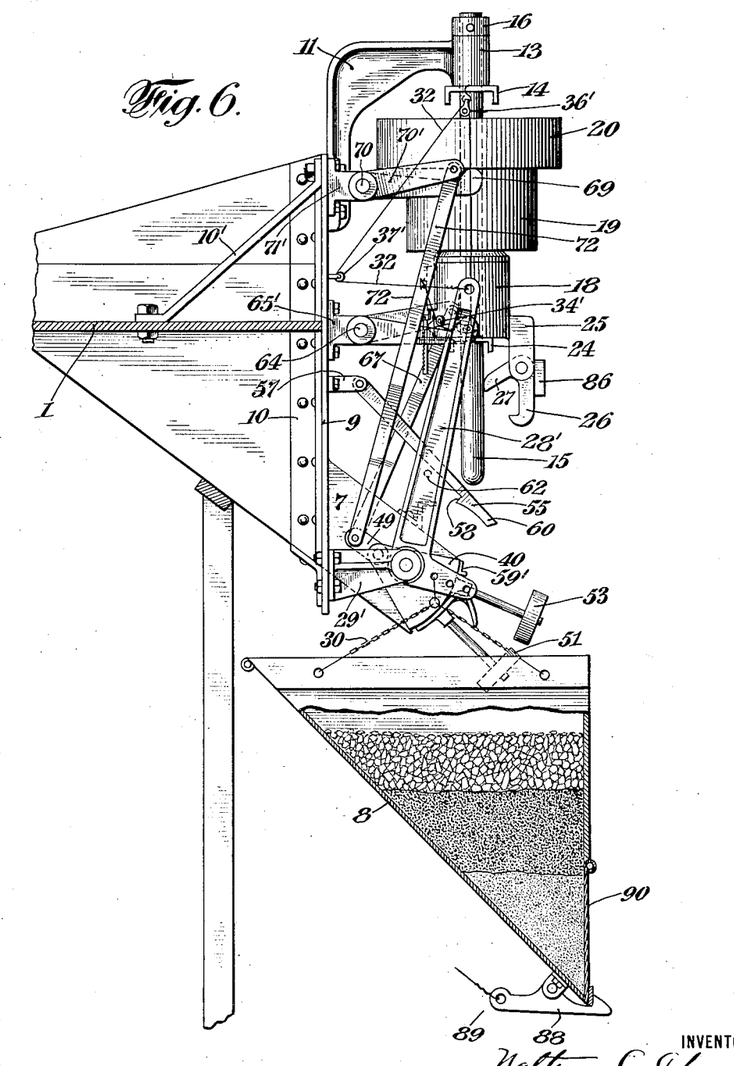
Fig. 6 is a side elevation looking from the left of Fig. 1 with the parts in the positions they assume when all of the ingredients have been discharged to complete the batch.

When a sufficient amount of the second material has been discharged into the weighing container, the weight of the charged container rocks the lever arms 28, 28' further forward, resulting in the following operations: The horizontal arm on lever 28' first engages the latch 55 to lift it from locking engagement with its gate 40, thus unlocking this third gate and permitting it to be swung open due to the downward movement of the third weight 20, the parts then being in the position shown in Figs. 5 and 8. The upward swing of the gate 40 further lifts the latch 55 until the latch drops behind the projection 59' on the gate to latch it open as described in connection with the second gate, at which time the material such as stone, commences to be discharged from the third gate. Immediately after the opening of the third gate the horizontal arm 60 on lever 28 is moved into position to again engage the right-hand latch member 54 to lift it and thus trip the second or right-hand gate 39 to close the same and stop the discharge of the sand, as shown in Fig. 5. During this time the combined first and second weights are lifted until the second weight engages the third weight, which in the meantime has been let down from its normal position due to the tripping of the latch 55, whereupon the cumulative weight of the three weights 18, 19, 20, is rendered effective to counterbalance the container being charged and arrest further forward movement of the levers 28, 28' until sufficient stone is discharged into the container to overbalance these weights. When the weights are overbalanced the lever 28' brings the horizontal arm 62 again into engagement with the latch 55 to lift the latch, as shown in Fig. 6, and close the third gate to shut off the supply of stone. The dispensing and weighing operation then being complete, the parts are in the positions shown in Fig. 6.

The latch 88 on the weighing container is then tripped as by a suitable pull rope 89, to permit the opening of the door 90 and the discharge of the materials into a suitable mixer. As the materials commence to discharge and lighten the weight in the container, the lever arms 28, 28' commence to swing backward, and the weights commence to descend on the guide rod, the third weight first coming into seating engagement with its normal supporting arms which arrest its further downward movement due to the fact that the locking latch 55 has now dropped down onto the top of the gate; and the second weight next engages its normal supporting arms and is arrested thereby, due to the fact that the corresponding latch 54 has dropped down into engagement with the top of its corresponding gate. The weight 18 continues to descend down to its normal position, at which time latch 26 is free to be swung into its normal position ready to engage the hook 85 on the front of the first or central gate 38 when the same is lifted to commence the dispensing of a second batch.

It will thus be seen that I have provided apparatus which will accurately and automatically weigh the different materials sequently and cumulatively; the opening up and cutting off of the flow of the different materials being controlled responsive to the weights, so that it is only necessary for the operator to lift the gate of the first material to be discharged, into position to be latched open, whereupon the dispensing of the materials is automatically carried out and the amount of each determined by weight.

In the event that for any reason it is desired to have the machine operate semi-automatically instead of entirely automatically, this can be very readily accomplished without any modification of the parts, and by merely removing the connection between the horizontal lever arms supporting the second and third weights and their corresponding gates, and by adjusting the stops 68, 73, on the shafts 64, 70, of these horizontal arms so as to permanently lock them in their horizontal position so that the second weight will be held on its arms until the first weight moves up into engagement therewith, and the third weight will be held on its arms until the second weight is moved up into engagement therewith.

If the machine is to be used as a semi-automatic machine, the forked links 72 and 67 are removed and the adjustable stops 68, 73 suitably adjusted to hold the weight-supporting arms horizontal, as above stated, whereupon the apparatus is operated as follows: The first gate is pulled open and latched on the latch 26, as described with regard to the fully automatic machine, and as the proper weight of material is discharged into the container, the first weight moves upward into engagement with the second weight, lever arm 28 rocking forward, as heretofore described, to remove locking latch 54 from above the second gate 39, whereupon that gate may be manually pulled open and latched behind the said latch member 54, as heretofore described; the continued upward movement of the first weight 18 tripping the gate to the first chute. As sufficient material is discharged from the second chute to overbalance the two weights, the forward movement of lever 28' unlocks the third gate to permit its being manually opened, and latched open by the latch member 55, and further forward movement of lever 28 lifts latch 54 to drop the second gate, the first and second weights moving up into engagement with the third weight. When sufficient material has been discharged into the container to overbalance the three weights, further forward movement of arm 28' trips the latch 55 permitting the third gate to be closed, whereupon, when the door to the weighing container is opened, the weights are allowed to gravitate to their normal positions and the latches automatically fall on top of their respective gates to prevent their being opened except in the desired predetermined order, so that in the semi-automatic as well as in the fully automatic machine there is no danger of the operator's pulling open the wrong gate first. The difference between the fully automatic and semi-automatic operation of the machine is that in the semi-automatic the gates are manually opened to commence the discharge of the materials into the container, but the discharge is automatically shut off responsive to the overbalancing of the weights, just as in the automatic.

It will be observed that in the assembled views of the machine the horizontal arms 61 and 62 extending horizontally and inwardly from the main bell crank levers 28, 28' for engaging the latch members 54, 55, have been shown and described as rigid arms. When these arms are rigid and are adapted to engage the latch member as shown, they will continue to lift the latch members more and more as the main levers are swung forward, and will hold the latches raised until the ingredients commence to discharge from the hopper 8 and the levers thereby permitted to be swung back toward the supporting frame by reason of the gravitation of the weights toward their normal positions. It will also have been observed that when the second and third weights 19, 20 come to rest respectively upon their normal supporting arms 63, 63', 69, 69', their weight upon these arms will, through the links connecting these arms with the gates controlling the second and third chutes, cause these gates to be rocked upwardly into open position, provided the respective rods 54, 55 have not been able to drop into locking position to prevent the gates from being swung open due to the engagement of the said arms 63, 69 by their respective weights. If the said latches should not have fallen into locking position in time to lock the gates closed before the presence of the weights on the respective arms should tend to open the gates, then these gates would be opened and material would be discharged from these two spouts into the weighing container 8 out of the proper sequence and out of control. In full size machines that have been built and operated, the adjustment and time elements of the various parts were such that the apparatus worked satisfactorily with these rigid arms 61 as shown and described in the drawings; but it has been found that the parts may be so constructed that the time elements are such that the latches would not drop to locking position in time to lock the gates closed; and in order to prevent any such possible contingency arising, I prefer to provide special means for overcoming the opening of the gates upon the return of the weights to their normal supporting arms. The means for insuring the proper return of the latches to lock the gates is shown in Fig. 12 in which the latch member 54' is shown as provided with a cam 91 secured to the face of the latch 54' nearest the weighing lever 28, and this cam member is adapted to be engaged by the horizontal arm 61' which extends out to the cam member and beneath the same so as to engage its lower surface to raise the latch, but which does not extend to the side of the latch 54 so that the arm 61' will engage the lower surface of the cam which is so shaped that as the lever 28 is rocked forward it will lift the latch more and more, lifting it first enough to unlock the gate as heretofore described to permit the same to be opened due to the corresponding weight, whereupon the gate will be latched in the open position as heretofore described, and then the arm will act on the cam to lift the latch further to trip the gate, at which time the arm 61' will have reached the forward end of cam 91 so as to allow the latch to drop past the arm 61' into locking position to thereupon lock the gate closed so as to prevent its being opened by the return of its corresponding weight. With this arrangement provision must be made for permitting the arm 61' to pass the cam 91 when lever 28 is rocked back to its normal position, because in that movement the arm 61' will engage the top of the cam 91. In order to allow this arm 61' to move backward with the lever 28 without interference from the latch or the cam 91, I pivot the arm 61' upon a bracket 92 the base 93 of which is secured as by bolts 94 to the lever 28, and the forward end of this bracket is forked as shown at 95, the arm 61 being pivoted in this fork and having a heel portion 96 projecting inwardly and beneath the pivot to engage the lower surface of the bracket 92. The engagement of this heel portion of the arm with the bracket will prevent the arm from giving way and swinging down when engaging the lower surface of the cam, but when the arm engages the upper surface of the cam, as in the backward swing of the lever 28, the arm will be permitted to swing upwardly on its pivot until it has passed the cam, at which time the arm 61' will drop to its normal position.

Since the time element of the parts of the machine cannot always be determined, and for one reason or another may vary in machines of the same construction, it is advisable to use some suitable device, such for example as that just described, in order to insure the proper locking of the gates before the weights are released, and any suitable arrangement may be utilized for this purpose. It will be understood that the lever 28' and the arm 55' on the left-hand side of the machine are similarly arranged and constructed.

While I have described my invention in detail in connection with the present preferred embodiment thereof, it will be obvious to those skilled in the art, after understanding the same, that various changes and modifications in the arrangement, form, construction and operation of the parts may be made without departing from the spirit or scope of my invention, and that various novel features of the apparatus may be used without utilizing the whole of the apparatus, and I aim in the appended claims to cover all such changes, modifications and parts as are within the scope of my invention.

Having thus described my invention, what I claim as new and desire to secure by Letters Patent, is:

1. In apparatus of the character described, the combination of a weighing container, means for discharging a plurality of different materials from their respective sources of supply for delivery into said container, a plurality of weights for determining the relative proportions of the different materials to be delivered to the container with means for connecting them to said container so that they are sequently rendered effective as counterweights for the container responsive to increase of weight of materials in said container, and means sequently cutting off the discharge of the different materials from their respective sources responsive to the successive overbalancing of the weights by the container.

2. In apparatus of the character described, the combination of a weighing container, means for sequently discharging a plurality of different materials from their respective sources of supply for delivery into said container, a plurality of weights for determining the relative proportions of the different materials to be delivered to the container, said weights being progressively and cumulatively rendered effective as counterweights for the weighing container responsive to increase of weight of materials in said container as the different materials are delivered, means operatively connecting the first effective weight with the container at the time of flow of the first material to be discharged therein to move said weight when it is overbalanced, means rendering the next effective weight ineffective until the first weight is substantially counterbalanced by the partially charged container, means for effecting the shutting off of the flow of the first material responsive to the overbalancing of the first weight, and means for effecting the shutting off of the flow of the second material responsive to the overbalancing of the two weights by the charged container.

3. In apparatus of the character described, the combination of a weighing container, means for discharging a plurality of different materials from their respective sources of supply for delivery into said container, a plurality of vertically movable weights to be progressively and cumulatively rendered effective as counterweights for the weighing container responsive to increase of weight of materials in said container, a guide for the weights, means comprising a lever and a cable operatively connecting the first effective weight with the weighing container at the time of flow of the first material to be discharged into the container, to move said weight when it is overbalanced, means rendering the next effective weight ineffective until the first weight is substantially counterbalanced by the partially charged container, means for effecting the shutting off of the flow of the first material responsive to the overbalancing of the first weight, and means for effecting the shutting off of the flow of the second material responsive to the overbalancing of the two weights by the charged container.

4. In apparatus of the character described, the combination of a weighing container, means for sequently discharging a plurality of different materials from their respective sources of supply for delivery into said container, a plurality of vertically movable weights having central openings therethrough, a central vertical guide for the weights extending through said openings, means for operatively connecting the weights with the container so that they are progressively rendered effective as counterweights for the container responsive to the increased weight of materials sequently delivered to the container, and means sequently shutting off the flow of the different materials from their respective sources, responsive to the progressive overbalancing of the weights by the container as it is charged.

5. In apparatus of the character described, the combination of a weighing container, means for discharging a plurality of different materials from their respective sources of supply for delivery into said container, a plurality of vertically movable weights for determining the relative proportions of the different materials to be delivered to the container and adapted to move, one into engagement with another when said one is overbalanced by material in the weighing container, means operatively connecting the first effective weight with the container at the time of flow of the first material into the container, and operating to raise the said first weight into engagement with the second weight when the first weight is overbalanced by the container being charged, and to raise said two weights when they are both overbalanced by the container, means rendering the next effective weight ineffective until the first weight is overbalanced by the partially charged container, means for effecting the shutting off of the supply of the first material responsive to the overbalancing of the first weight, and means for effecting the shutting off of the supply of the second material responsive to the overbalancing of the two weights by the charged container.

6. In apparatus of the character described, the combination of a weighing container, means for discharging a plurality of different materials from their respective sources of supply for delivery into said container, a plurality of aligned vertically movable weights for determining the relative proportions of the different materials to be delivered to the container and progressively rendered effective as counterweights for the weighing container responsive to increased weight of material in the container, means operatively connecting the first effective weight with the container at the time of flow of the first material to be discharged into the container to move said weight when it is overbalanced, means normally supporting the other weights spaced apart from each other, each in position to be respectively engaged and lifted by the upward movement of the next preceding weight when said next preceding weight is overbalanced and moved by the container being charged, means for effecting the shutting off of the flow of the first material responsive to the overbalancing of the first weight, and means for effecting the shutting off of the flow of the other materials respectively responsive to the respective overbalancing of the weights corresponding to said materials.

7. In apparatus of the character described, the combination of a weighing container, means for discharging a plurality of different materials from their respective sources of supply for delivery into said container, a plurality of vertically spaced and aligned weights to be progressively rendered effective as counterweights for the weighing container responsive to increase of weight of material in the container, means for connecting the first effective weight with the container at the time of flow of the first material to be discharged into the container to move said weight when it is overbalanced, said connecting means comprising two pivoted levers, a guided cable secured to the first counterweight and having its ends secured to the free ends of said levers and means connecting the other ends of the levers with the weighing container, whereby as the container is charged to overbalance the first weight the levers are swung on their pivots to pull on the cable and lift the first weight into engagement with the second weight, means normally supporting said second weight until it is engaged by the first weight, and means respectively for shutting off the flow of the first and second materials to be discharged into the weighing container, said shut-off means being operated respectively responsive to the respective overbalancing of said first and second weights by the container being charged.

8. In apparatus of the character described, the combination of a plurality of separate hoppers for containing a plurality of different materials to be mixed, chutes respectively extending from said hoppers, a frame arranged transversely of said hoppers, a plurality of laterally spaced horizontal swiveled bell crank levers mounted on said frame, a weighing container supported from one end of said bell crank levers, a vertical guide located intermediate said levers, a plurality of vertically aligned and spaced movable weights through which said vertical guide passes, pulleys arranged laterally of each side of the vertical guide, and a cable secured to the lowermost weight and running over said pulleys and having its ends connected respectively to the free ends of said bell crank levers whereby when the levers are rocked by the weight of the container being charged they will cause the first weight to be lifted into engagement with the second weight, gates for shutting off the discharge of material from said chutes, means for holding the first gate open, co-operating means for effecting the release of said gate to shut off the flow of material from said first chute when the container being charged overbalances the first weight, means for holding the second gate open when material is desired from its chute, and co-operating means for effecting the release of the said second gate to shut off the flow of material from its chute when the combined first and second weights become overbalanced.

9. In apparatus of the character described, the combination of a weighing container, means for sequently discharging a plurality of different ingredients from their respective sources of supply for delivery into said container, a plurality of weights with means for connecting them to said container so that they are progressively rendered effective as counterweights for the container responsive to increase of weight of materials in said container, individually operating shut-off means for respectively shutting off the flow of material from the different sources, individual latches for holding said shut-off means in open position when opened, and means sequently tripping said latches to cut off the flow of materials from the respective sources, responsive to the progressive overbalancing of the weights by the container being charged.

10. In apparatus of the character described, the combination of a weighing container, means for sequently discharging a plurality of different ingredients from their respective sources of supply for delivery into said container, a plurality of weights for determining the relative proportions of the different materials to be delivered to the container, with means for connecting said weights to said container so that they are progressively rendered effective as counterweights for the container responsive to increase of weight of materials in said container, individually operating shut-off means for respectively shutting off the flow of material from the different sources, locking means respectively operatively related to said shut-off means to normally prevent their being opened except in a predetermined order, and means actuated responsive to the means connecting the counterweights with the container for sequently unlocking said shut-off means as the container is being charged.

11. In apparatus of the character described, the combination of a weighing container, means for discharging a plurality of different materials from their respective sources of supply for delivery into said container, a plurality of weights for determining the relative proportions of the different materials to be delivered to the container, with means for connecting them to said container so that they are progressively rendered effective as counterweights for the container responsive to increase of weight of materials in said container, means for effecting the cutting off of the discharge of the first material to be delivered to the container, responsive to the overbalancing of its corresponding weight, and means for effecting the discharge of the next material also responsive to the overbalancing of said last weight, and means for shutting off the discharge of said last material responsive to the overbalancing of its corresponding weight.

12. In apparatus of the character described, the combination of a weighing container, means for discharging a plurality of different materials from their respective sources of supply for delivery into said container, a plurality of weights for determining the relative proportions of the different materials to be delivered to the container, with means for connecting them to said container so that they are progressively rendered effective as counterweights for the container responsive to increase of weight of materials in said container, gates respectively controlling the discharge of the materials, means operatively related to the gate controlling the first material to be delivered to the container to effect the shutting off of the discharge of said material, responsive to the overbalancing of its corresponding weight, means operatively related to the next gate to be opened to effect the discharge of the next material, also responsive to the overbalancing of the said first weight, and means operatively related to the second gate to effect the shutting off of the discharge of the second material, responsive to the overbalancing of its corresponding weight.

13. In apparatus of the character described, the combination of a weighing container, means for discharging a plurality of different materials from their respective sources of supply for delivery into said container, a plurality of weights for determining the relative proportions of the different materials to be delivered to the container, and progressively rendered effective as counterweights for the weighing container responsive to increase of weight of materials in said container, means operatively connecting the first effective weight with the container at the time of flow of the first material to be discharged therein to move said weight when it is overbalanced, means for effecting the cutting off of the discharge of the first material to be delivered to the container, responsive to the overbalancing of its corresponding weight, a gate controlling the discharge of the next material, a member normally supporting the second weight and operatively connected with said gate for opening said gate responsive to the movement of the connecting means between the container and the first weight when said weight has been overbalanced, and means for effecting the closing of said gate when the second weight has been overbalanced.

14. In apparatus of the character described, the combination of a weighing container, means for discharging a plurality of different materials from their respective sources of supply for delivery into said container, a plurality of weights to be progressively rendered effective as counterweights for the weighing container responsive to increase of weight of materials in said container, means operatively connecting the first effective weight with the container at the time of flow of the first material to be discharged therein to move said weight when it is overbalanced, means for effecting the cutting off of the discharge of the first material to be delivered to the container, responsive to the overbalancing of its corresponding weight, a pivoted gate controlling the discharge of the next material, means normally supporting the second weight, said supporting means comprising a movable member, connections between the same and the gate adapted to swing the gate on its pivot when unlocked, and means for locking the gate when closed, means for effecting the unlocking of the gate and the release of the second weight responsive to the overbalancing of the first weight and for effecting the closing of the gate responsive to the overbalancing of the second weight.

15. In apparatus of the character described, the combination of a weighing container, means for discharging a plurality of different materials from their respective sources of supply for delivery into said container, a plurality of vertically movable weights adapted to move one into engagement with another when the one is overbalanced by the weighing container, means operatively connecting the first effective weight with the container at the time of flow of the first material to be discharged into the container, and operating to raise the said first weight into engagement with the second weight when the first weight is overbalanced by the container being charged, and to raise said two weights when they are both overbalanced by the container, gates for respectively controlling the discharge of the different materials, means for locking the second gate closed, means normally connecting the second effective weight with its corresponding gate to open said gate when unlocked, means for unlocking the second gate responsive to the overbalancing of the first weight to release the second weight and open said second gate, and means for effecting the shutting off of the flow of the first material responsive to the overbalancing of the first weight, said second gate being closed responsive to the overbalancing of the second weight.

16. In apparatus of the character described, the combination of a weighing container, means for discharging a material to be weighed for delivery into said container, a vertically movable weight for determining the amount of material to be charged into said container, a stop, and connections between said weight and container, comprising a cable, an automatic ratchet take-up device, and a pivoted lever mounted on a support, whereby any stretch in the cable will be taken up by the ratchet device when the weight is in its lowermost position determined by the stop.

17. In apparatus of the character described, the combination of a weighing container, means for discharging a material to be weighed for delivery into said container, a vertically movable weight for determining the amount of material to be charged into said container, connections between said weight and container comprising a ratchet take-up device with its movable element slidably mounted on the weight, a pair of pivoted levers, one at each side of the weight, a looped cable connecting the ends of said levers with said sliding ratchet element, and suitable guide pulleys over which said cable passes, and a stop operatively related to said sliding ratchet element to engage the same when the weight is in its lowermost position if there is any slack in the cable for the purpose of moving the ratchet member to take up such slack.

18. In apparatus of the character described, the combination of means for receiving ingredients to be weighed, means for discharging a plurality of different materials from their respective sources of supply for delivery into said means for receiving the materials, a weight with means operatively connecting the same with the receiving means to move said weight when it is overbalanced by the charged receiving means, means for effecting the shutting off of the flow of the first material responsive to the overbalancing of said weight, and means for effecting the discharge of the next material also responsive to the overbalancing of said weight.

In testimony whereof, I have signed my name to this specification.

NATHAN C. JOHNSON.